Patented May 21, 1935

2,002,145

UNITED STATES PATENT OFFICE 2,002,145

METHOD OF CLEARING THE CONTENTS OF FERMENTATION AND STORAGE CONTAINERS

Gottfried Jakob, Perlach, near Munich, Germany, assignor to Chemische Werke Marienfelde Aktiengesellschaft, Berlin-Marienfelde, Germany No Drawing. Application April 19, 1932, Serial No. 606,285. In Germany April 23, 1930

1 Claim. (Cl. 210—1)

My invention relates to an agent for clarifying liquids such as beer, beer wort, wine, fruit juice, etc., by binding matter which is suspended in the liquid. For instance, in beer wort, albumen particles may be present in flocculated and in still unflocculated condition. Those particles which are in flocculated condition, are bound immediately by the clarifying agent, while the still unflocculated ones are precipitated by the agent and bound, like those which were present in flocculated condition.

My invention also relates to the methods of preparing the agent, and of using same.

In order to accelerate and complete the clarifying of liquids in containers for the fermentation or storage of liquids, such as beer vats, the bottom of the container is covered with wood shavings known as chips which facilitate the settling of yeasts and precipitates separating from the liquid; for the same purpose, materials with short fibres, such as glass-wool, or powdery materials, such as polishing powder, kaolin, bolus, have been used.

This invention relates to clarifying means of the last named variety, that is, to the use as a clarifying agent of wood minute particles impregnated with pitch.

My novel agent is distinguished from the shavings or chips referred to in that its particles are quite small. For instance, they may be grains of sawdust, or similar materials. Sawdust and other waste materials are not valuable, and recovery is not considered, as against the comparatively large shavings or veneers used as chips which, after having performed their function, are removed from the beer vat or other container, and cleansed in hot water whereupon they may be used again.

In order to prevent the floating of the chips and disturbing of the liquid, it has been proposed to make the chips of metal coated with tin, pitch, or other substance.

It has also been proposed to soak wooden chips in isinglass or similar beer-fining ingredients.

Both the metal chips and the wooden chips to be soaked as described, are comparatively large, and not small particles.

Specific gravity does not play any part in the old chips, except for the obvious fact that it binds the metal chips to the bottom of the container.

I depart from the old art altogether by introducing the specific gravity of the wood particles, or, rather, the units consisting of a wood particle and its coating of pitch, as a governing factor in the function of the agent.

The specific gravity of the units is regulated so that they descend very slowly in the liquid to be clarified.

Uncoated wooden particles would not descend at all, unless the specific gravity of the wood which is used, were more than the specific gravity of the liquid. On the other hand, particles of pitch by themselves would descend too rapidly on account of their comparatively high specific gravity.

By combining pitch and wood in every particle of the agent according to my invention, the specific gravity of the particles or units, and the velocity at which they descend in the liquid, are regulated to a predetermined amount.

My novel agent, with the predetermined specific gravity of its particles or units, is superior to the old chips in two respects:

Firstly, its particles move continuously toward the bottom of the container, contacting and binding the particles of suspended matter in the liquid.

Secondly, the agent, consisting of small particles, presents a much larger area than the comparatively large chips. It may be said to consist of subdivided chips.

As to the specific gravity of the liquid to be clarified, the specific gravity of wine and fruit juice is 1.005 and that of beer is 1.009. The specific gravities of woods vary over a wide range, from .5 to 1.1, but it is obvious that the wood of which my agent is made, must be selected with consideration of the fact that the specific gravity of certain kinds of pitch is 1.066. The specific gravity of the particular kind of pitch which is used, is obviously the first consideration. Other factors are the specific gravity of the wood to be coated, its porosity, the viscosity of the pitch, etc.

A third point in the favor of my novel agent is its economy. Wooden chips are comparatively valuable and must be recovered by special treatment for cleaning them. Iron chips coated with pitch are obviously very expensive. My agent, on the other hand, may be made of any waste product, such as sawdust, and need not be recovered as it is practically valueless.

My novel agent consequently possesses high efficiency combined with low cost, as compared with the old chips.

My novel agent has the property that it combines the good clarifying effect of the pitch with the buoyancy of the wood so that the clarifying agent, after being introduced at the top of the fermentation or storage container, is suspended in the liquid in the container for a much longer time than the specifically heavier pitch alone would take in sinking, and thus its surface is effectively exposed to the liquids for a longer time.

What I claim is:

The method of clarifying liquids by binding matter which may be suspended in the liquid, or be precipitated from the liquid and thus become suspended therein, comprising comminuting wood whose specific gravity is so related to that of pitch that a particle of the wood, when coated with pitch, descends slowly in the liquid to be clarified, coating the particles with pitch, and throwing them into the liquid from above.

GOTTFRIED JAKOB.